Figure 1:
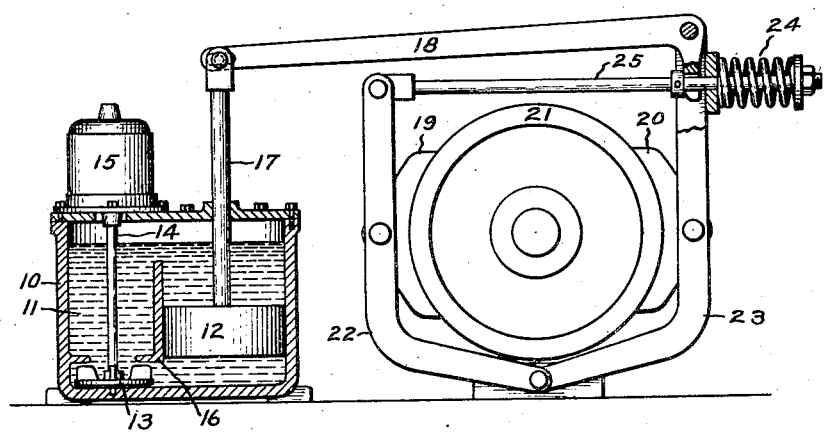

March 5, 1935. W. O. LUM 1,993,612

ELECTRORESPONSIVE OPERATING MEANS

Filed May 20, 1927

Inventor
Walter O. Lum,
by *[signature]*
His Attorney.

Patented Mar. 5, 1935

1,993,612

UNITED STATES PATENT OFFICE 1,993,612

ELECTRORESPONSIVE OPERATING MEANS

Walter O. Lum, Schenectady, N. Y., assignor to General Electric Company, a corporation of New York Application May 20, 1927, Serial No. 193,016

11 Claims. (Cl. 188—170)

My invention relates to improvements in electroresponsive operating means for various devices such as brakes, switches, or the like, having a member biased to one position and movable to another position, the operation of which requires a relatively large force and the operation of which is required to be easily controlled to meet operating conditions.

To obtain ease and simplicity of application and control, electromagnets ordinarily are employed as the electroresponsive operating means for devices of the above character. The mechanical mounting and connection of the electromagnet is not difficult and merely by closing an energizing circuit for the electromagnet, the member may be moved from its biased position and maintained in its other position and by opening the circuit the member may be returned to its initial position. Electromagnets, however, are practical only for relatively short stroke and light load service due to inherent limitations of design and power and particularly the tremendous shocks both mechanical and electrical imposed by energizing large electromagnets from the ordinary commercial sources of electrical energy.

Thus for heavy duty long stroke service, other forms of electroresponsive operating devices are required such, for example, as electric motor mechanical drives or electric motor driven pumps with fluid pressure pistons operated thereby.

However, the electric motor mechanical drives ordinarily involve complicated and expensive speed reducing gearing having crank mechanism, or the like, for changing rotational to linear motion as well as complicated and expensive limit or reversing switch mechanism for the proper control thereof.

Furthermore, one form of electric motor driven pump and fluid pressure operating piston arrangement heretofore available involves a pressure storage chamber supplied from the electric motor driven pump under automatic pressure switch control with interconnecting piping having inlet and exhaust valves associated therewith for controlling the application of the fluid pressure to the piston. In another form an electric motor driven gear pump has been connected to supply pressure to the fluid pressure operating piston but this requires relief valves, exhaust valves, interconnecting piping, stuffing boxes, and the like, together with a somewhat complicated electrical control arrangement to effect operation and return of the pressure operated piston. The initial expense, the difficulties of mechanical application to the device to be operated and of control, and also the maintenance troubles of such equipments due to leaks, sticking valves, repacking stuffing boxes, lubricating bearings and the like, leave much to be desired in the way of a more simple and reliable electroresponsive operating means.

The principal object of the present invention is to provide an improved electrohydraulic operator for heavy duty long stroke service which is in the form of a compact and inexpensive structural unit capable of being energized readily from the ordinary commercial sources of electrical energy and applied and controlled in substantially the same way as an electromagnet and in addition free from the various maintenance troubles outlined above.

One of the principal practical difficulties with the ordinary type of fluid pressure operating means is that of providing a stuffing box which will not leak when subjected to the pressures necessary for operation of the devices to be moved in accordance with variations in fluid pressure. Another practical difficulty is that if a stuffing box is provided which is so tightly fitted with the device to be moved in accordance with variations in fluid pressure as to avoid leakage, an appreciable friction effect is encountered which very seriously impairs the efficiency of the fluid pressure operating means.

In accordance with my invention, I provide an arrangement which either eliminates stuffing boxes entirely or where the construction is such that a stuffing box is desirable, the stuffing box is subjected to either no fluid pressure or a fluid pressure of such a small degree that troubles due to leakage are avoided.

A further feature of the invention resides in the provision of means whereby the device to be operated in accordance with variations in fluid pressure will have an extent of movement which is determined by the speed of the electric motor driven pump creating the difference in fluid pressure, as distinguished from the time of operation of the element creating the fluid pressure. In accordance with this feature of the invention, I provide an impeller type of pump for creating the fluid pressure, and in order to either eliminate stuffing boxes entirely or to provide an arrangement whereby such stuffing boxes as are provided are subjected to a relatively low fluid pressure, I mount the electric motor driven impeller pump and the piston to be operated in accordance with variations in fluid pressure in a fluid container or casing unit in such a way that a passage is provided from the exhaust of the impeller to one side of the piston and another passage is provided interconnecting the intake of the impeller with the opposite side of the piston, the impeller being positioned so that it is below the level of the liquid within which the piston is immersed.

The arrangement is such that by energizing the driving motor for the impeller the load operating piston will be moved to one position and maintained therein as long as the motor is energized, the impeller pump and piston combination serving to change rotation of the motor to linear motion and at the same time providing an effective mechanical advantage for the motor having an over-running clutch action, thus eliminating all necessity for mechanical gearings, levers, or the like, as well as all necessity for limit switches for the motor or relief valves for the pump. Thus, through the agency of the impeller and piston combination, a relatively small torque motor can produce and maintain indefinitely a tremendously increased force on the load operating piston. Moreover, upon deenergization of the electric driving motor, the piston and impeller combination provides an automatic unclutching action whereby the load operating piston may return to its initial position. Furthermore, the electric driving motor never can be stalled due to overloads and hence overload protective devices for the electric driving motor are unnecessary. With the impeller pump and piston immersed in a container provided with lubricating oil as the power transmitting medium therebetween, the apparatus is entirely self-lubricated and self-contained and requires only external connections to the load and to a source of electrical energy.

Figure 2:
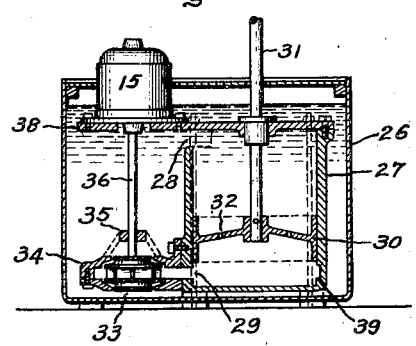
Figure 3:
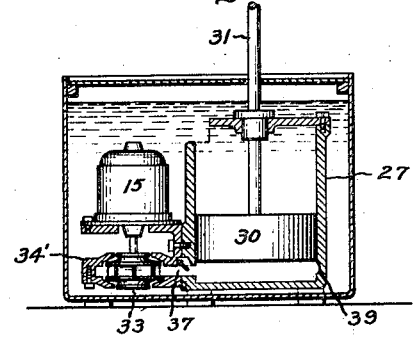
Figure 4:
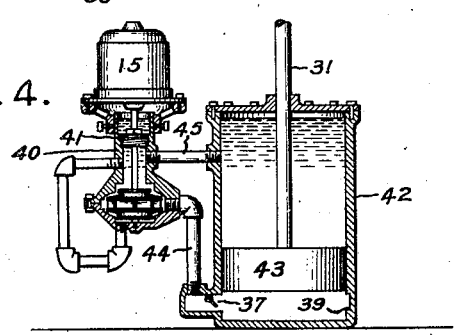
Figure 5:
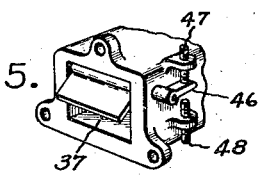

My invention is susceptible of adoption in various forms and, in order to indicate this feature of the invention, I have shown four specifically different embodiments of the invention in the accompanying drawing. Referring to the drawing, Fig. 1 is a part sectional view of a very simple form of a fluid pressure motor in accordance with the invention, the impeller for creating the difference in fluid pressure being connected with an electric motor to be operated thereby, and the piston of the fluid pressure motor being connected with a spring set friction brake. Although the invention has a particular application as the operating means for a friction brake, as indicated in this figure of the drawing, and as will be explained more fully hereinafter, the invention is not necessarily limited to this particular use. In Fig. 2 the various parts of the fluid pressure motor are so designed as to be immersed as a unit in a fluid container. In Fig. 3 I have indicated an arrangement having the same general features as the arrangement of Fig. 2, with the exception that the electric driving motor for the impeller is totally immersed in the liquid within the container so that a comparatively short shaft interconnecting the rotating element of the motor and the impeller is necessary. This figure also shows an arrangement whereby a valve in the exhaust passage of the impeller pump is utilized to regulate the elevation and the lowering of the fluid pressure motor piston. Fig. 4 shows a modified construction in which the impeller pump is manufactured as a unit and suitably constructed to support an electric driving motor at the upper end thereof, the pump being interconnected by piping with a cylinder having the operated piston therein, in such a manner that the impeller is positioned below the level of the liquid within the cylinder. Fig. 5 is a detail showing the construction of the valve in the exhaust passage of the impeller pump, and the manner in which this valve is adjusted so as to thereby regulate the operation of the piston of the fluid pressure motor.

Referring to the drawing, and in particular to Fig. 1, since this figure shows a very simple construction embodying the broad general features of the invention it will be noted that I have provided a substantially closed container 10 for a fluid 11, and within which the piston 12 of the fluid pressure motor is suitably supported for vertical movement between two positions, each below the level of the liquid 11 and also within which the impeller 13 for creating the difference in fluid pressure is also suitably supported below the level of the liquid. The fluid 11 is preferably some medium such as a lubricating oil which has relatively free flowing characteristics. It will be observed that the impeller 13 is mounted on the shaft 14 which extends through the removable top of the container 10 into the liquid 11 and that the variable speed electric motor 15 is connected with the upper end of shaft 14 and is vertically mounted on the removable top of the container 10. End thrust is particularly undesirable in electrical driving means directly coupled to the shaft upon which the armature is mounted for rotation. In Figs. 2, 3 and 4 is shown an opposed inlet impeller pump which draws in the oil from the top and bottom and expels the same through the exhaust at the sides. In this way the forces tending to produce end thrust are balanced against each other and end thrust is eliminated. The partition 16 forms a portion of the cylinder walls for the piston 12 and this partition is so formed that a passage is provided between the lower surface of the piston 12 and the exhaust of the impeller 13 and also another passage between the upper surface of the piston 12 and the intake of the impeller. The piston rod 17 extends through and is slidably mounted in the top of the container 10, and it will be noted that this rod as well as the shaft of motor 15 need not be provided with a packing for preventing the leaking of the fluid from the container. The piston rod 17 is connected with the lever 18 of the operating mechanism for the brake shoes 19 and 20 which cooperate with the brake wheel 21. The brake shoes 19 and 20 are carried by brake levers 22 and 23, respectively, and these brake levers are biased to such a position that the brake shoes are in frictional engagement with the brake wheel 21 by means of the spring 24 which presses directly on the brake lever 23 and which pulls on the brake lever 22 through the link 25. This frictional brake arrangement is intended to be merely conventional and to represent a well known form of friction brake. As before explained, while the invention has a particular application as the operating means for a friction brake, nevertheless, as will be explained more fully hereinafter, the fluid pressure operating means has such characteristics that it lends itself very readily to use as the operating means for various other devices, such as electric switches, for example.

The operation of this form of my invention is as follows: With the parts in their respective positions indicated in Fig. 1, when the electric motor 15 is energized to drive the impeller 13 in either direction and at a predetermined speed, the impeller will set up a pressure on the lower surface of the piston 12. When the pressure difference thus created between the lower and the upper surfaces of the piston exceeds the force of biasing spring 24, the piston will be caused to rise within the container and the final force producing this movement will be determined by the speed of operation of the impeller. Asssume that the impeller is operated at such a speed that the piston will move upwardly to such an extent that the brake shoes 19 and 20 are released from the brake wheel 21 against the biasing effect of the spring 24. As long as the impeller is maintained operating at the determined speed, the brake shoes will be held out of engagement with the brake wheel. Thus it will be seen that an over-running clutch action permits continued operation of the electric driving motor 15 and impeller 13 after the piston and the brake operating rods 18 have been moved to their limiting position. In case it is desired to apply the brake shoes to the brake wheel and thus effect a setting of the brake, the electric motor 15 will either be stopped or the speed thereof reduced. The pressure differential acting on the piston 12 will thus be decreased and the piston will gradually return toward the position indicated in the drawing. It will be seen that while this setting of the brake will be relatively rapid in case the motor 15 is stopped, nevertheless, a certain cushioning effect is had in the application of the brake, which is very desirable, as will be understood by those skilled in the art. Thus, the building up of the pressure of the brake shoes on the brake wheel is gradual rather than there being a sudden application and a rebound and then a final building up of pressure between the brake shoes and the brake wheel, as is the case in many forms of electromagnetic brakes.

It will be observed that the electro-hydraulic operator of the invention may be manufactured and assembled as a unit. With all of the operating elements mounted upon or enclosed within the fluid container 10, the unit readily may be applied for the operation of various devices. It is only necessary to connect the electric driving motor 15 to an ordinary commercial source of electrical energy and the load engaging end of the piston 17 to the device to be operated. A switch for closing and opening the energizing circuit of motor 15 is the only control apparatus necessary unless variable speed control in the motor is desired to effect gradual application for removal of the operating force in the manner previously noted. It will also be observed that the lubricating fluid within the container serves for the lubrication of the bearing for the lower end of the shaft 14 and it will also be observed that this fluid serves as a lubricating medium for the piston 12 and the cylinder walls within which the piston operates. In case the fluid leaks past the piston 12, no serious results are experienced, provided the leakage is a moderate amount, such as is occasioned by the wear of the parts. One of the important advantages of the invention as applied to the operation of a friction brake is that an inherent compensating effect is had for the wear of the brake shoes. Thus, as the brake shoes wear, the piston 12 will merely settle further within the container, thus compensating exactly for the wear of the shoes and at the same time avoiding a variation in the operation of the fluid pressure motor.

The embodiment of the invention shown in Fig. 2 is one in which the fluid pressure motor is inserted as a unit within the container 26 which holds the lubricating oil or other medium acted upon by the impeller pump. In this arrangement the fluid pressure motor comprises a cylinder 27 having an aperture 28 in the upper end thereof and another aperture 29 in the lower end thereof. The piston 30 is positioned in the cylinder 27 and is connected to a piston rod 31 which is journaled in the upper end of the cylinder 27 as shown. The piston has leakage holes 32 so that when the impeller pump 33 is stopped, the piston will certainly return to its lowermost position.

The impeller pump is of the double inlet type with a housing 34 which carries a pedestal 35 for supporting the shaft 36 of the pump. The housing with the impeller and shaft supported therein is secured as a unit to the side of the cylinder 27 so that the exhaust of the impeller registers with the lower opening 29 in the cylinder. The electric motor 15 is supported on a part 38 which is secured to the upper end of the cylinder 27. Since the fluid enters the upper and lower inlets of the impeller in opposite directions and is forced radially outward into the exhaust, there is practically no end-thrust imposed upon the motor driven shaft 36. The double inlet impeller also enables a large volume of the liquid to be handled and thus produces rapid operation of piston 30 which is of distinct advantage in some fields of service. This form of the invention has in general the same operating characteristics as the form previously described in connection with Fig. 1. A further feature of this arrangement is that the aperture 29 is spaced from the bottom of the cylinder. An advantage of this arrangement is that when the piston rod 31 is connected to effect the release of a friction brake, for example, in case the brake shoes have become worn to such an extent that they should be replaced, the piston 30 will have settled downward in the cylinder 27 to such an extent that the raising of the piston due to a pressure differential created by the impeller pump 33 is impossible. Thus, the brake will not be released (a safe operating condition) and the operator will be warned that the brake shoes should be adjusted or replaced. With this arrangement as in the case of the arrangement of Fig. 1, a comparatively long impeller shaft is required. The cylinder wall is provided with a groove as indicated at 39 so that when the brake shoes have been worn to such a degree that the piston will be moved below the upper edge of the aperture 29 with the brakes applied, a ready flow of the fluid to the lower portion of the cylinder from the impeller will be permitted.

In Fig. 3 I have shown an arrangement having the same general features of construction, with the exception that the pump housing 34' also forms a support for the electric motor 15 and the butterfly valve 37 is provided. With this arrangement a comparatively short impeller shaft is required and no further supporting means for the impeller of the pump is required other than the bearings of the motor. Where a lubricating oil of free flowing characteristics and of insulating properties is used, no material disadvantages are encountered in the immersion of the electric motor in the fluid within the container. The butterfly or check valve 37 is carried by the pump housing, and this valve is preferably adjustable as is indicated in Fig. 5, so that the raising and lowering of the piston 30 may be very accurately regulated. It will be seen that in all of the forms of the invention the impeller and the impeller exhaust are located beneath the level of the oil within the container. This is one of the characteristic features of the invention and the arrangement whereby I am able to eliminate the troublesome high pressure packing glands of former fluid pressure motors.

The construction of the fluid pressure motor of Fig. 4 is in principle the same as the forms of the fluid pressure motors heretofore described in detail. However, in this form, the electric motor 15 is mounted on a bracket on the upper end of the pump housing 40 and the impeller shaft is journaled in this housing at 41. The pump housing is suitably interconnected with the cylinder 42, within which the piston 43 operates in response to variations in fluid pressure created by the impeller pump. These connections comprise a pipe 44 which forms the exhaust passage for the impeller pump and a pipe 45 which forms the intake passage. It will be noticed that in this arrangement the impeller is likewise located below the level of the liquid in the container which in this case is the cylinder 42, together with the pipes 45 and 44 and the pump housing 40.

In Fig. 5 I have shown in more detail the construction of the adjustable valve 37. This valve is suitably mounted in a portion of the exhaust passage of the impeller pump and is provided with a member 46 which is on the outside of the exhaust passage. By adjusting the screws 47 and 48, the valve may be adjusted so as to independently regulate the raising and the lowering of the piston of the fluid pressure motor.

What I claim as new and desire to secure by Letters Patent of the United States, is:—

1. In combination, a device having a member operable between two positions and biased to one of said positions, an electric motor for operating said member to and maintaining the same in the other position upon energization of the motor and permitting the member to return to said one position upon deenergization of the motor, and operating connections between the motor and member having a mechanical advantage and capable of transforming rotary to linear motion, said connecton permitting an over-running clutch action and including a liquid container, an impeller pump immersed in said liquid container and connected to be driven by the motor, a piston immersed in said liquid container and connected to said member, and partition means in said liquid container for restricting communication from the exhaust of the impeller pump to one side of said piston and from the other side of said piston to the inlet of said pump.

2. An electro-hydraulic operator unit comprising a container, a liquid therein, a load operating member having one end extending into said liquid and the other end extending through said container above the level of said liquid, a piston immersed in said liquid and connected to said one end of the operating member, an electric motor mounted on said container and having a shaft extending into said liquid, a rotatable impeller immersed in said liquid and connected to said shaft, and partition means below the level of said liquid in said container providing communicating passages from the exhaust of the impeller pump to one side of said piston and from the other side of said piston to the inlet of said pump.

3. An electro-hydraulic operator unit including a substantially closed container, a liquid therein, an electric motor mounted on the top of the container and having a shaft extending into said liquid, an operating rod extending into said liquid through the top of the container and slidably mounted for operation between two positions and biased to one of said positions, a piston connected to said operating rod and immersed in said liquid, an impeller pump connected to said motor shaft and immersed in said liquid, and means disposed below the level of said liquid for connecting the inlet and outlet of said pump to create a liquid pressure differential on opposite sides of the piston to operate said rod from said biased position to the other position and maintain the rod in said other position when said motor is energized.

4. An electro-hydraulic operator unit including a container, a liquid therein, an electric motor mounted on said container above the level of said liquid and having a shaft extending into said liquid, an operating rod extending downwardly into said liquid and slidably mounted on said container for operation between two positions and biased to one of said positions, operative connections between the motor and said operating rod including a piston connected to said operating rod below the level of said liquid, a double inlet impeller pump connected to said motor shaft below the level of said liquid, and means providing communicating passages below the level of said liquid from the exhaust of said pump to one side of said piston and from the opposite side of said piston to both inlets of said pump for creating a pressure differential on said piston to move the operating rod from said biased position to the other position, and maintain the same therein with an automatic over-running clutch action when said motor is energized.

5. An electro-hydraulic operator unit comprising a container having a removable top, a liquid in said container, an electric motor vertically mounted on the removable top of said container and having a shaft extending downwardly into said liquid, a pump having a rotatable impeller mounted on said shaft below the level of said liquid, a fluid pressure responsive piston mounted in said container for vertical movement between two positions, each below the level of said liquid and biased to one of said positions, a piston rod extending upwardly from said piston through the said removable top of said container, and partition means in said casing for restricting communication from the exhaust of said pump to one side of said piston and from the other side of said piston to the inlet of said pump to effect operation of the piston from said biased position to the other position upon energization of the motor.

6. In combination, a container, a liquid therein, a piston immersed in said liquid, an impeller pump immersed in said liquid and having its inlet and outlet connected to create a pressure differential in the liquid on the opposite sides of said piston to effect operation thereof, and a valve for regulating variations of said pressure differential.

7. In combination, a container, a liquid therein, an impeller pump immersed in said liquid, a piston immersed in said liquid, means providing communicating passages between the exhaust of said pump and said piston and between said piston and the intake of said pump, a check valve in said means adjacent the exhaust of said pump and means for independently adjusting the effects of said valve in regulating the movement of said piston in each direction.

8. A fluid pressure operator comprising a liquid container, a liquid within said container, a piston and an impeller pump immersed in said liquid, means providing a communicating passage between the exhaust of said impeller and one side of said piston and a communicating passage between the other side of said piston and the intake of said impeller, the said passage between the exhaust of said impeller and said piston being constructed to prevent movement of said piston by the pressure differential created by said impeller when said piston has moved to a predetermined position with reference to said exhaust passage.

9. An electro-hydraulic brake system comprising a spring-applied brake, an electric motor, means for energizing and deenergizing the motor, a hydraulic pressure-responsive means for releasing said brake, a liquid reservoir, and an impeller pump driven by said motor and connected between said reservoir and said hydraulic pressure-responsive means, said pump itself inherently having the characteristic of maintaining a predetermined limited static pressure-head during its operation.

10. An electro-hydraulic brake system comprising a brake, an electric motor, means for energizing and deenergizing the motor, a hydraulic pressure-responsive means for actuating said brake, a liquid reservoir, and an impeller pump driven by said motor and connected between said reservoir and said hydraulic pressure-responsive means, said pump itself inherently having the characteristic of maintaining a predetermined limited static pressure-head during its operation, the rotors of the pump and motor being rigidly mounted on the same shaft.

11. An electro-hydraulic brake system comprising a brake, an electric motor, means for energizing and deenergizing the motor, a hydraulic pressure-responsive means for actuating said brake, and an impeller pump driven by said motor and connected to said hydraulic pressure-responsive means, said pump itself inherently having the characteristic of maintaining a predetermined limited static pressure-head during its operation.

WALTER O. LUM.